(12) United States Patent
Pribonic

(10) Patent No.: US 6,412,611 B1
(45) Date of Patent: Jul. 2, 2002

(54) EDDY CURRENT BRAKE SYSTEM WITH DUAL USE CONDUCTOR FIN

(75) Inventor: Edward M. Pribonic, Seal Beach, CA (US)

(73) Assignee: Magnetar Technologies, LTD, Seal Beach, CA (US)

(*) Notice: Subject to any disclaimer, the term of this patent is extended or adjusted under 35 U.S.C. 154(b) by 0 days.

(21) Appl. No.: 09/618,086

(22) Filed: Jul. 17, 2000

(51) Int. Cl.[7] .................................................. B60L 7/00
(52) U.S. Cl. ......................................... 188/165; 187/375
(58) Field of Search ............................. 104/60; 187/375, 187/376; 188/158, 159, 161, 162, 163, 164, 165

(56) References Cited

U.S. PATENT DOCUMENTS

| | | | | |
|---|---|---|---|---|
| 3,650,357 A | * | 3/1972 | Nelson et al. ........... 188/251 R |
| 3,730,317 A | * | 5/1973 | Jaeschke ..................... 188/163 |
| 3,806,062 A | * | 4/1974 | Hofmann et al. ........... 188/267 |
| 4,341,290 A | * | 7/1982 | Baermann ................... 188/165 |
| 4,483,034 A | | 11/1984 | Baermann ................... 188/165 |
| 5,277,125 A | * | 1/1994 | DiFonso et al. ............ 188/158 |
| 5,301,773 A | * | 4/1994 | Jamieson et al. ........... 187/375 |
| 5,366,044 A | * | 11/1994 | Jamieson et al. ........... 188/375 |
| 5,467,850 A | * | 11/1995 | Skalski ....................... 188/165 |
| RE35,999 E | * | 12/1998 | Gutknecht ..................... 104/60 |
| 6,003,636 A | * | 12/1999 | Yumura ....................... 187/376 |
| 6,062,350 A | * | 5/2000 | Spieldiener et al. ........ 188/161 |
| 6,161,653 A | * | 12/2000 | Skalaki et al. .............. 187/376 |

FOREIGN PATENT DOCUMENTS

DE 198255 * 4/1907

* cited by examiner

Primary Examiner—Christopher P. Schwartz
Assistant Examiner—Robert A. Siconolfi
(74) Attorney, Agent, or Firm—Walter A. Hackler

(57) ABSTRACT

An eddy current brake system with dual use conductive fin includes a linear array of spaced apart permanent magnets and a non-magnetic electrically conductive fin. The magnets are mounted with respect to the fin for enabling passage past one another at a distance sufficient to cause eddy currents to be induced resulting in a braking force between the magnets and the fin. A mechanical brake is provided for frictionally engaging the fin and a surface treatment of the fin and enables the fin to sustain mechanical abuse of friction without effecting a change in the eddy current braking.

21 Claims, 1 Drawing Sheet

EDDY CURRENT BRAKE SYSTEM WITH DUAL USE CONDUCTOR FIN

The present invention is generally related to permanent magnet linear brakes and is more particularly directed to eddy brake systems for movable cars, for example, rail supported cars, go-carts, elevator cars, conveyor cars, and roller coaster cars, among others.

As a specific example, the majority of hereinbefore constructed entertainment rides, such as roller coasters, have relied on friction brakes for deceleration and stopping of well-mounted cars. However, due to friction, such brakes are subject to wear and must be regularly monitored and serviced to maintain proper operating conditions.

Linear eddy current brakes would be a preferable replacement for such friction brakes inasmuch as since no contact is made with the rail for braking and consequently, they are free from wear due to friction.

Eddy current brakes are based on the law of induction. When a conductive member is moved through a magnetic field, eddy currents are generated in the member and a secondary magnetic field caused by the eddy currents is opposed to the magnetic field through which the member passes.

The resulting force component acts opposite to the traveling direction of the member. Unfortunately, such eddy current brakes are motion dependant and cannot hold a vehicle or device in a fixed position or effect a total stop on an inclined rail. Thus, a separate secondary friction brake has been used to supplement an eddy current brake. This separate system adds to the cost of the total braking system, and typically requires a second brake fin for use exclusively in the friction brake.

The present invention provides for a conductive fin having dual use for the induction of eddy currents therein and for providing an engagement surface for a mechanical brake shoe.

SUMMARY OF THE INVENTION

A brake system in accordance with the present invention generally includes a linear array of spaced apart permanent magnets and a non-magnetic electrically conductive fin. The magnets and fin are mounted for enabling passage past one another at a distance sufficient to cause eddy currents to be induced in the fin resulting in a braking force between the magnets and the fin.

A mechanical brake is also provided for frictionally engaging the same fin. Importantly, a surface treating on the fin enables the fin to sustain mechanical abuse friction without effecting a changeable electrical conductivity of the fin, thus, the surface treatment enables dual use of the fin. That is, the fin function both to provide eddy current braking and frictional braking.

This dual use reduces the number of parts required and allows a more efficient use of limited space for brakes by placing both eddy current brakes and mechanical brakes in tandem along a single center line as will be hereinafter discussed in greater detail.

The surface treatment on the fin enables the fin to maintain its efficiency as a non-conductor for the induction of eddy currents.

More practically, the surface treatment may be selected from a group of coatings including, for example, hard chrome, nickel, nickel-chrome, high velocity spray coating, and electroless nickel coating.

In one embodiment of the present invention, the fin is mounted in a vertical orientation for passage by the magnets. In this embodiment, the mechanical brake may comprise a pinch brake.

In another embodiment of the present invention, the fin may be mounted in a horizontal orientation for passage by the magnets.

BRIEF DESCRIPTION OF THE DRAWINGS

The advantages and features of the present invention will be better understood by the following description when considered in conjunction with the accompanying drawings in which.

DETAILED DESCRIPTION

Figure 1:
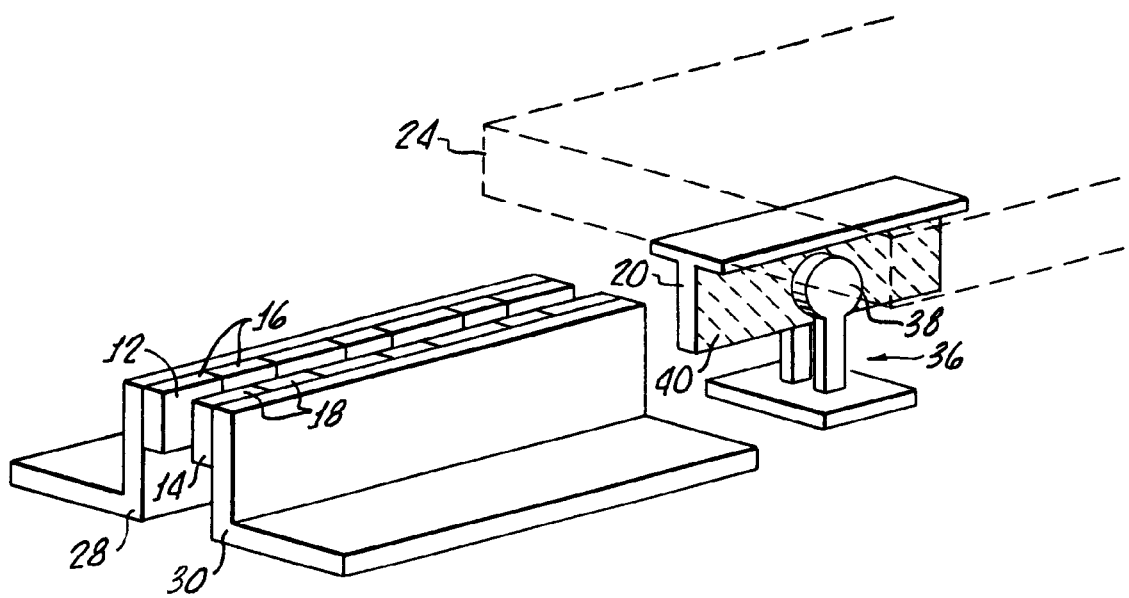
FIG. 1 is a representation of one embodiment in accordance with the present invention generally showing a linear array of spaced apart permanent magnets. A non-magnetic conductive fin is provided and mounted in a vertical orientation for passage by the permanent magnets along with an in-line frictional brake for also acting on the fin. A surface treatment on the fin enables the fin to sustain mechanical abuse of friction without effecting a change in the induced eddy currents therein.

With reference to FIG. 1, there is shown a brake system 10 in accordance with the present invention which includes linear arrays 12, 14 of spaced apart permanent magnets 16, 18 and a non-magnetic electrically conductive fin 20 fixed to a vehicle or device, 24 and descending therefrom in a vertical orientation.

Brackets 28, 30 provide a means for mounting the magnets 16, 18 with respect to the fin 20 for enabling passage past one another at a distance sufficient to cause eddy currents to be induced in the fin 20 resulting in a braking force between the magnets 16, 18 and the fin 20.

Such eddy current braking systems have been described in U.S. patent application Ser. No. 09/446,206 "Apparatus Including Eddy Current Braking System" filed Nov. 22, 1999 and U.S. patent application Ser. No. 09/504,575 "Eddy Current Braking Apparatus" filed Feb. 15, 2000. These applications are to be incorporated herewith including all specification and drawings for the purpose for describing the principles of the eddy current braking components of the present invention.

A mechanical brake 36 is provided and positioned for frictionally engaging the fin 20 by way of brake shoes 38. A conventional pinch brake may be utilized.

It should be appreciated that since a single conducting fin 20 may be utilized for both eddy current braking and frictional braking, the number of parts otherwise required is significantly reduced. This affords a more efficient use of limited space for brakes by disposing both the eddy current brake magnet 16, 18 and mechanical brake 36 in tandem along a center line define by the fin 20.

This configuration of the present invention is enabled through the use of a surface treatment, or coating, 40 indicated in cross-hatch in FIG. 1.

The coating 40 is selected according to the conductor fin material, desired wearing performance and severity of use. The coating provided has little or no effect on the conductivity of the fin 20, and accordingly, the induced eddy currents therein are not changed by any physical abuse to the coating by the brake 36 during use.

Suitable coatings include but are not limited to hard chrome, nickel, nickel-chrome combinations, high velocity oxygen fuel spray coatings (HVOF), electroless nickel coating among others. As an example, when the fin 20 is constructed of chrome-copper alloy, a coating of hard chrome with a thickness of 0.005" to 0.025", preferably 0.01" to 0.02", provides suitable results. Techniques for application of the surface treatment of coating include:

Thermal Powder/Thermal wire—metallic powders or wires such as Chromium Oxide, Aluminum Oxide and Alumina—Titania coatings are used in high wear applications sprayed at high temperature which can deposit high thicknesses (0.035") depending on the powder material, bond strengths to 3,500 psi.

Arc-wire—Application of bronze, steel, nickel, stainless steel, or zinc, depending on the required materials. The process offers quite good bond strengths (10,000 psi +), very good repeatability, good thicknesses.

Plasma coating—provides a broad material selection available, especially in tungsten and chromium carbides and ceramics, metallics, carbide, and superalloy coatings.

Excellent bond strengths (to 12,000 psi), low porosity (1%–3%) and good thicknesses.

High Velocity Oxygen Fuel (HVOF)—Thermal spray on coatings of tungsten and chromium carbides, such as tungsten carbide-cobalt coatings and a variety of carbides, and other materials such as chromium carbide-nickel chrome (Cr3C2—NiCr). Superior bond strengths (well over 12,000 psi), no through porosity and excellent thicknesses (0.250 inch+depending on material.

Any other coating or plating material as found to provide suitable mechanical and magnetic performance can be used.

Figure 2:
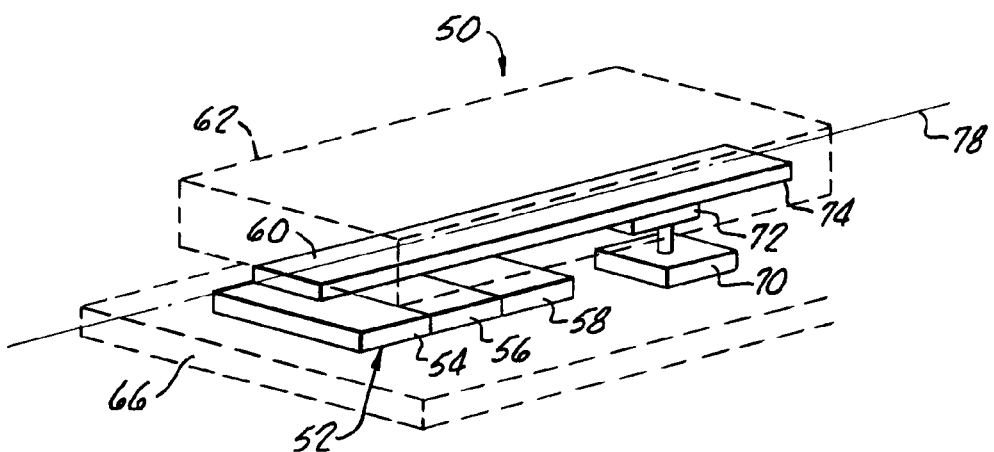
FIG. 2 is a representation of another embodiment of the present invention in which the fin is mounted in a horizontal orientation for passage by permanent magnet.

With reference now to FIG. 2, there is shown an alternative embodiment of a braking system 50 which includes a linear array of spaced apart permanent magnets 54, 56, 58 and a non-magnetic electrically conductive fin 60 disposed in a horizontal orientation to a car 62.

A foundation 66 provides means for mounting the magnets with respect to fin 60 for enable passage past one another at a distance sufficient to cause eddy currents to be induced in the fin 60, resulting in a braking force between the magnets 54, 56, 58 and the fin. Arrangements of this type are disclosed in U.S. patent application Ser. No. 09/504,575 hereinabove referenced and incorporated into the present application by this specific reference thereto.

In this system 50, a mechanical brake 70 urges a brake shoe 72 into engagement with an underside 74 of the fin 60. A coating, not shown in FIG. 2, but identical to that shown in FIG. 1 is provided for enabling the conductive fin to sustain the mechanical abuse of friction and pressure caused by the brake 70. As with the embodiment 10 shown in FIG. 1, the magnets 54, 56, 58 and brake 70, may be aligned in tandem beneath the fin 60 along a center line 78 defined by the fin 60.

Although there has hereinabove described a brake system in accordance with the present invention for the purpose of illustrating the manner in which the invention may be used to advantage, it will be appreciated that the invention is not limited thereto. Accordingly, all modifications, variations or equivalent arrangements which may occur to those skilled in the art, should be considered within the scope of the invention as defined in the appended claims.

What is claimed is:

1. A brake system comprising:
   a linear array of spaced apart permanent magnets;
   a non-magnetic electrically conductive fin;
   means mounting the magnets with respect to the fin for enabling passage past one another at a distance sufficient to cause eddy currents to be induced in the fin resulting in a braking force between the magnets and the fin;
   a mechanical brake for frictionally engaging the fin; and
   a surface treatment on the fin for enabling the fin to sustain mechanical abuse of friction without effecting a change of electrical conductivity of the fin.

2. The brake system according to claim 1 wherein said surface treatment comprises a coating.

3. The brake system according to claims 2 wherein said coating is selected from a group consisting of hard chrome, nickel, nickel-chrome, high velocity spray coating and electrical nickel coating.

4. The brake system according to claim 2 wherein said coating has a typical thickness of between about 0.005" and about 0.025".

5. The brake system according to claim 1 wherein the fin is mounted in a vertical orientation for passage by the magnets.

6. The brake system according to claim 5 wherein said mechanical brake comprises a pinch brake.

7. The brake system according to claim 1 wherein the fin is mounted in a horizontal orientation for passage by the magnets.

8. A brake system comprising:
   a linear array of spaced apart permanent magnets;
   a non-magnetic electrically conductive fin;
   means mounting the magnets with respect to the fin for enabling, passage past one another at a distance sufficient to cause eddy currents to be induced in the fin resulting in a braking force between the magnets and the fin;
   a mechanical brake for frictionally engaging the fin; and
   a surface treatment on the fin for enabling the fin to sustain mechanical abuse of friction without effecting a change in the induced eddy currents.

9. The brake system according to claim 8 wherein said surface treatment comprises a coating.

10. The brake system according to claim 9 wherein said coating is selected from a group consisting of hard chrome, nickel, nickel-chrome, high velocity spray coating and electrical nickel coating.

11. The brake system according to claim 9 wherein said coating has a typical thickness of between about 0.005" and about 0.025.

12. The brake system according to claim 8 wherein the fin is mounted in a vertical orientation for passage by the magnets.

13. The brake system according to claim 12 wherein said mechanical brake comprises a pinch brake.

14. The brake system according to claim 8 wherein the fin is mounted is horizontal orientation for passage by the magnets.

15. A brake system comprising:
   a stationary linear array of spaced apart permanent magnets;

a single non-magnetic electrically conductive fin disposed on a moveable car;

means mounting the magnets for enabling passage of the fin thereby at a distance sufficient to cause eddy currents to be induced in the fin resulting in a braking force between the magnets and the fin;

a mechanical brake for frictionally engaging the fin; and a surface treatment on the fin for enabling the fin to sustain mechanical abuse of friction without effecting a change of electrical conductivity of the fin.

16. The brake system according to claim 15 wherein said surface treatment comprises a coating.

17. The brake system according to claims 16 wherein said coating is selected from a group consisting of hard chrome, nickel, nickel-chrome, high velocity oxygen fuel spray coating and electrical nickel coating.

18. The brake system according to claim 16 wherein said coating has a thickness of 0.025".

19. The brake system according to claim 15 wherein the fin is mounted in a vertical orientation for passage by the magnets.

20. The brake system according to claim 19 wherein said mechanical brake comprises a pinch brake.

21. The brake system according to claim 15 wherein the fin is mounted in a horizontal orientation for passage by the magnets.

* * * * *